United States Patent
Balaji et al.

(10) Patent No.: US 12,435,286 B2
(45) Date of Patent: Oct. 7, 2025

(54) PROCESS AND REACTOR FOR CONVERTING CARBON DIOXIDE INTO CARBON MONOXIDE, INVOLVING A CATALYST

(71) Applicant: SHELL USA, INC., Houston, TX (US)

(72) Inventors: Sayee Prasaad Balaji, Amsterdam (NL); Mark Klokkenburg, Amsterdam (NL); Robert Schouwenaar, Amsterdam (NL); Dominik Johannes Michael Unruh, Amsterdam (NL); Jose Atilio Quevedo Enriquez, Amsterdam (NL); Sven Felske, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 495 days.

(21) Appl. No.: 17/925,488

(22) PCT Filed: May 28, 2021

(86) PCT No.: PCT/EP2021/064385
§ 371 (c)(1),
(2) Date: Nov. 15, 2022

(87) PCT Pub. No.: WO2021/244975
PCT Pub. Date: Dec. 9, 2021

(65) Prior Publication Data
US 2023/0183587 A1 Jun. 15, 2023

(30) Foreign Application Priority Data
Jun. 1, 2020 (EP) .................................... 20177671

(51) Int. Cl.
*C10K 3/02* (2006.01)
*C01B 3/16* (2006.01)

(52) U.S. Cl.
CPC ................ *C10K 3/026* (2013.01); *C01B 3/16* (2013.01); *C01B 2203/0822* (2013.01)

(58) Field of Classification Search
CPC .... C01B 3/16; C01B 2203/0822; C10K 3/026
See application file for complete search history.

(56) References Cited

U.S. PATENT DOCUMENTS 2,898,204 A 8/1959 Totzek
3,723,344 A 3/1973 Reynolds
(Continued)

FOREIGN PATENT DOCUMENTS

AU 472920 B2 6/1976
CN 103170339 B 10/2016
(Continued)

OTHER PUBLICATIONS

International Search Report and Written Opinion received for PCT Patent Application No. PCT/EP2021/064403, mailed on Aug. 10, 2021, 11 pages.
(Continued)

*Primary Examiner* — Jafar F Parsa
(74) *Attorney, Agent, or Firm* — SHELL USA, INC.

(57) ABSTRACT

The present invention relates to a process for converting carbon dioxide and hydrogen by performing a reverse water gas shift reaction at elevated temperature, the process comprising introducing carbon dioxide, hydrogen and oxygen into a reaction vessel having an inlet and an outlet, and, wherein the reverse water gas shift reaction takes place in two different zones of the reaction vessel, being a top zone (z1) adjacent to a bottom zone (z2). The process produces a product stream comprising mainly carbon monoxide, hydrogen and water. The process is useful in reducing the carbon footprint of certain industrial technologies, and in addition, the process is useful in the production of synthesis gas.

7 Claims, 5 Drawing Sheets

(56) References Cited

U.S. PATENT DOCUMENTS

| | | | |
|---|---|---|---|
| 3,738,940 | A | 6/1973 | Auer et al. |
| 3,919,114 | A | 11/1975 | Reynolds |
| 5,496,530 | A | 3/1996 | Vannby et al. |
| 5,714,657 | A | 2/1998 | Devries |
| 7,090,789 | B2 | 8/2006 | Schioedt et al. |
| 7,435,759 | B2 | 10/2008 | Jung et al. |
| 7,498,001 | B2 | 3/2009 | Tonkovich et al. |
| 7,846,979 | B2 | 12/2010 | Rojey et al. |
| 7,906,098 | B2 | 3/2011 | Kuperman et al. |
| 8,658,554 | B2 | 2/2014 | Dorner et al. |
| 9,249,079 | B2 | 2/2016 | Mamedov et al. |
| 10,041,670 | B2 | 8/2018 | Disselhorst et al. |
| 11,078,077 | B2 | 8/2021 | Maass et al. |
| 2004/0175327 | A1 | 9/2004 | Hagemeyer et al. |
| 2006/0211777 | A1 | 9/2006 | Severinsky |
| 2009/0012188 | A1 | 1/2009 | Rojey et al. |
| 2009/0224209 | A1 | 9/2009 | Eilers et al. |
| 2009/0313886 | A1 | 12/2009 | Hinman et al. |
| 2010/0000874 | A1 | 1/2010 | Hinman et al. |
| 2010/0292076 | A1 | 11/2010 | Wagner et al. |
| 2013/0034478 | A1 | 2/2013 | Doty |
| 2014/0127121 | A1 | 5/2014 | Maass et al. |
| 2014/0288195 | A1 | 9/2014 | Castelli et al. |
| 2014/0315711 | A1 | 10/2014 | Kumar et al. |
| 2015/0129805 | A1 | 5/2015 | Karpenko et al. |
| 2015/0307352 | A1 | 10/2015 | Kumar et al. |
| 2015/0336795 | A1 | 11/2015 | Kern et al. |
| 2016/0052785 | A1 | 2/2016 | Maass et al. |
| 2016/0296916 | A1 | 10/2016 | Kim et al. |
| 2016/0332874 | A1 | 11/2016 | Mamedov |
| 2017/0080407 | A1 | 3/2017 | Schunk et al. |
| 2017/0197829 | A1 | 7/2017 | Andersen |
| 2018/0327261 | A1 | 11/2018 | Ott et al. |
| 2019/0359894 | A1 | 11/2019 | Heidel et al. |
| 2021/0246034 | A1 | 8/2021 | Kaisalo et al. |
| 2022/0048776 | A1 | 2/2022 | Balaji et al. |

FOREIGN PATENT DOCUMENTS

| | | |
|---|---|---|
| CN | 109201048 A | 1/2019 |
| DE | 102015015968 A1 | 6/2017 |
| EP | 3050865 A1 | 8/2016 |
| FR | 2963932 A1 | 2/2012 |
| JP | 3834621 B2 | 10/2006 |
| JP | 5402683 B2 | 1/2014 |
| KR | 101864602 B1 | 6/2018 |
| WO | 9709293 A1 | 3/1997 |
| WO | 2013135664 A1 | 9/2013 |
| WO | 2014180888 A1 | 11/2014 |
| WO | 2017067648 A1 | 4/2017 |
| WO | 2017072649 A1 | 5/2017 |
| WO | 2017077421 A1 | 5/2017 |
| WO | 2018219986 A1 | 12/2018 |

OTHER PUBLICATIONS

Vázquez et al., "Catalyst Screening and Kinetic Modeling for Co Production by High Pressure and Temperature Reverse Water Gas Shift for Fischer-tropsch Applications", Industrial & Engineering Chemistry Research, Jul. 3, 2017, vol. 56, Issue No. 45, pp. 13262-13272.

Bustamante et al., "Kinetic Study of the Reverse Water Gas Shift Reaction in High-temperature, High-pressure Homogeneous Systems", Fuel Chemistry Division Preprints, Aug. 2002, vol. 47, Issue No. 2, pp. 663-664.

International Search Report and Written Opinion received for PCT Patent Application No. PCT/EP2021/064385, mailed on Aug. 6, 2021, 11 pages.

Zonetti et al., "The NixCe0.75Zr0.25-xO2 Solid Solution and the RWGS", Applied Catalysis A: General, Apr. 5, 2014, vol. 475, pp. 48-54.

Su et al., "Designing of Highly Selective and High-temperature Endurable Rwgs Heterogeneous Catalysts: Recent Advances and the Future Directions", Journal of Energy Chemistry, Sep. 2017, vol. 26, Issue No. 5, pp. 854-867.

Meiri et al., "Simulation of Novel Process of Co2 Conversion to Liquid Fuels", Journal of Co2 Utilization, Jan. 1, 2017, vol. 17, pp. 284-289.

Wolf et al., "Syngas Production via Reverse Water-gas Shift Reaction Over a Ni-al2o3 Catalyst: Catalyst Stability, Reaction Kinetics, and Modeling", Chemical Engineering & Technology, Jun. 1, 2016, vol. 39, Issue No. 6, pp. 1040-1048.

Lee et al., "The Power of Molten Salt in Methane Dry Reforming: Conceptual Design With a Cfd Study", Chemical Engineering and Processing—Process Intensification, 2021, vol. 159, Issue No. 11, 14 Pages.

International Search Report and Written Opinion received for PCT Patent Application No. PCT/EP2021/086210, mailed on Mar. 23, 2022, 11 pages.

Ye et al., "Effect of modifiers on the activity of a Cr2O3/Al2O3catalyst in the dehydrogenation of ethylbenzene with CO2", Green Chemistry, Issue 7, May 31, 2005, pp. 524-528.

International Search Report and Written Opinion received for PCT Patent Application No. PCT/EP2019/083047, mailed on Jan. 27, 2020, 10 pages.

Office Action Received for Chinese Application No. 201980075239. 6, Mailed on Feb. 10, 2023, 17 Pages (9 Pages of English Translation and 8 Pages of Official Copy).

Dai et al., "Reduction of Co2 to Co via Reverse Water-gas Shift Reaction Over Ceo2 Catalyst", Korean Journal of Chemical Engineering, 2018, vol. 35, Issue No. 2, pp. 421-427.

Liu et al., "Reverse Water-Gas Shift Reaction Over Ceria Nanocube Synthesized by Hydrothermal Method", Catalysis Communications, 2016, vol. 76, pp. 1-6.

Kovacevic et al., "Effects of Morphology of Cerium Oxide Catalysts for Reverse Water Gas Shift Reaction", Catalysis Letters, 2016, vol. 146, pp. 770-777.

Inamuddin et al., "Thermochemical Conversion of Carbon Dioxide to Carbon Monoxide by Reverse Water-Gas Shift Reaction over the Ceria-Based Catalyst", Conversion of Carbon Dioxide into Hydrocarbons vol. 1 Catalysis, Environmental Chemistry for a Sustainable World, vol. 40, pp. 43-61, 2020.

PROCESS AND REACTOR FOR CONVERTING CARBON DIOXIDE INTO CARBON MONOXIDE, INVOLVING A CATALYST

CROSS REFERENCE TO RELATED APPLICATIONS

This is a National stage application of International application No. PCT/EP2021/064385, filed 28 May 2021, which claims priority of European Patent application No. 20177671.3, filed 1 Jun. 2020 which is incorporated herein by reference in its entirety.

FIELD OF THE INVENTION

The present invention relates to a process involving a catalyst for converting carbon dioxide and hydrogen into a product stream comprising carbon monoxide, water and hydrogen. Further, the present invention relates to a catalytic reverse water-gas shift process unit, suitable for use in said process.

The process and process unit are useful in reducing the carbon footprint of certain industrial technologies. Further, the process and process unit are useful in the production of synthesis gas.

BACKGROUND OF THE INVENTION

The increased demand for energy resulting from worldwide economic growth and development have contributed to the release of greenhouse gases into the atmosphere. The increase in concentration of greenhouse gases, especially carbon dioxide has resulted in global warming. It is imperative to reduce the global carbon footprint to mitigate global warming and this has been regarded as one of the most important challenges facing mankind in the $21^{st}$ century. The capacity of the earth system to absorb greenhouse gas emissions is already exhausted, and under the Paris climate agreement, current emissions must be fully stopped until around 2070. To realize these reductions, the energy scenario of the world must evolve to move away from conventional carbon-based fossil fuel energy carriers and also decrease the carbon dioxide concentration in the atmosphere. A timely implementation of the energy transition requires multiple approaches in parallel. For example, energy conservation, improvements in energy efficiency and electrification play a role, but also efforts to use carbon dioxide to produce other compounds plays an important role as a substitute for fossil fuel-based feedstock. For example, synthesis gas (i.e. a mixture of hydrogen and carbon monoxide) may be produced from carbon dioxide. Synthesis gas is a building block to produce several useful chemicals and fuels.

Historically, synthesis gas is usually produced from steam reforming using for example natural gas as feedstock or partial oxidation of coal or heavy oil residue feedstock. All these processes involve the production of carbon dioxide as a by-product of the steam reforming reactions or partial oxidation reactions. In order to truly decrease the carbon dioxide concentrations, utilization of fossil fuel-based feedstock is not a viable solution. As an alternative, the reverse water gas shift (RWGS) reaction may be used to prepare syngas, using carbon dioxide as a starting material. However, the reaction of carbon dioxide with hydrogen via the RWGS reaction to produce carbon monoxide and water is endothermic in nature. Sufficient thermal energy must be supplied to the reactants (i.e. carbon dioxide and hydrogen) to facilitate the endothermic RWGS reaction. Substantial carbon monoxide is produced from carbon dioxide at temperatures beyond 600° C. reaching a maximum at temperatures around 1200° C. RWGS reaction at lower temperatures at around 700-1000° C. require catalysts to enable the conversion of carbon dioxide to carbon monoxide. These catalysts must be able to withstand high temperatures as well as be resistant to catalyst poisons such as compounds containing sulphur.

Currently, the status of RWGS developments have been on lab scale (Catalyst Screening and Kinetic Modeling for CO Production by High Pressure and Temperature Reverse Water Gas Shift for Fischer-Tropsch Applications, Francisco Vidal Vazquez, Peter Pfeifer, Juha Lehtonen, Paolo Piermartini, Pekka Simell and Ville Alopaeus, Ind. Eng. Chem. Res. 2017, 56, 13262-13272; Kinetic study of the reverse water gas shift reaction in high-temperature, high pressure homogeneous systems, Felipe Bustamantel, Robert Enick, Kurt Rothenberger, Bret Howard, Anthony Cugini, Michael Ciocco and Bryan Morreale, Fuel Chemistry Division Preprints 2002, 47(2), 663).

US20150336795 discloses a process for the parallel preparation of hydrogen, carbon monoxide and a carbon-comprising product, wherein one or more hydrocarbons are thermally decomposed and at least part of the hydrogen-comprising gas mixture formed is taken off from the reaction zone of the decomposition reactor at a temperature of from 800 to 1400° C. and reacted with carbon dioxide to form a gas mixture comprising carbon monoxide and hydrogen.

For large scale conversion of carbon dioxide there is a need to be able to more efficiently and economically carry out the RWGS reaction. Achieving high conversion of carbon dioxide selectively to carbon monoxide and avoiding by-products like methane and carbon formation requires high temperatures of around 1200° C. which necessitates heat from external furnaces which pose considerable engineering challenges while scaling up to large scales. It is therefore imperative that a novel RWGS process is required to efficiently convert carbon dioxide to carbon monoxide at high temperatures at a large scale.

The process of the present disclosure provides a solution to said need.

SUMMARY OF THE INVENTION

Accordingly, the present disclosure relates to a process for converting carbon dioxide and hydrogen by performing a reverse water gas shift reaction at elevated temperature, the process comprising introducing carbon dioxide, hydrogen and oxygen into a reaction vessel having an inlet and an outlet, and wherein the reverse water gas shift reaction takes place in two different zones of the reaction vessel, being a top zone (z1) adjacent to a bottom zone (z2), wherein
  (a) no catalyst is present in the top zone (z1) of the reaction vessel, and
  (b) at least a gas stream comprising carbon dioxide, a hydrogen rich gas stream and an oxygen rich gas stream are introduced into the inlet at the top zone (z1) of the reaction vessel in separate feed streams, wherein the hydrogen rich gas stream is introduced into the reaction vessel at a temperature between 15 and 450° C., and
  (c) the hydrogen rich gas stream and oxygen rich gas stream being introduced in close vicinity of each other, wherein at least the hydrogen rich gas stream and the oxygen rich gas stream are introduced into the reaction vessel via a burner comprising coaxial channels for the separate introduction of the different gas streams, the burner being located at the top of the reaction vessel, wherein the hydrogen and oxygen in the hydrogen rich gas stream and oxygen rich gas stream undergo a combustion reaction upon entering the reaction vessel, thereby providing the heating energy required for the reverse water-gas shift reaction; and (d) the temperature in the top zone (z1) of the reaction vessel is maintained in the range of 700 to 1200° C., preferably in the range of 700° C. to 900° C., by varying the flow of any of the gas streams which are introduced into the reaction vessel; and (e) the bottom zone (z2) of the reaction vessel is provided with a catalyst bed comprising a reverse water gas shift catalyst, the top of the catalyst bed being placed at a distance from the burner in the top zone (z1) sufficient to prevent damage from flame impingement on the catalyst bed;

(f) wherein in the bottom zone (z2) of the reaction vessel a catalytic reverse water gas shift reaction takes place at elevated temperatures, thereby converting unconverted carbon dioxide and hydrogen;

to produce a product stream comprising mainly carbon monoxide, hydrogen and water;

wherein in step (c) the hydrogen rich gas stream and oxygen rich gas stream are introduced into the reaction vessel in close vicinity of but not next to each other; and wherein part of the gas stream containing carbon dioxide is introduced via a channel in between the hydrogen rich gas stream and the oxygen rich gas stream.

Advantageously, in the present process, the heat required for the reverse water gas shift reaction in top zone (z1) and the catalytic reverse water gas shift reaction in bottom zone (z2) is provided by the combustion of oxygen and hydrogen inside the top zone (z1) of the reactor.

Further, the present disclosure relates to a reverse water-gas shift process unit comprising at least one reaction vessel provided with a burner at the top of the top zone (z1) of the vessel, and a catalyst bed in the bottom zone (z2) of the vessel, operatively connected to a cooling unit, and further comprising at least one gas introduction line connected to a water splitter unit.

According to the present disclosure, the hydrogen and/or oxygen used in the RWGS process may be provided from a water splitting unit, which advantageously may be powered by renewable power sources.

DETAILED DESCRIPTION OF THE DISCLOSURE

The present disclosure relates to a (partially) catalytic RWGS process for converting a gas stream comprising carbon dioxide into products. According to the present disclosure, the feed streams to the reverse water gas shift reaction vessel comprise several gas streams: at least a gas stream comprising carbon dioxide, a hydrogen rich gas stream and an oxygen rich gas stream. Optionally, additional gas streams may be introduced into the reaction vessel as co-feed or pre-mixed gas streams (i.e. pre-mixed with any of the other gas streams), such as, but not limited to, streams comprising off-gases or natural gas.

A gas stream comprising carbon dioxide herein means a gas stream comprising from 1% to 100% carbon dioxide by volume. Sources of the carbon dioxide may be diverse, such as for example, but not limited to carbon dioxide captured from air or from flue gases, off-gases, and the like. The gas stream comprising carbon dioxide comprises carbon dioxide and may also comprise other gases, for example, hydrocarbons such as methane, ethane, propane, butane, pentane, inert gases such as argon, other gases such as nitrogen, oxygen, traces of hydrogen, carbon monoxide or combinations of all the mentioned gases thereof. Preferably, the gas stream comprising carbon dioxide contains carbon dioxide in the range of 30 to 100 volume %, and even more preferred 50 to 100 volume %.

The hydrogen rich gas stream comprises hydrogen as a main component, suitably at least 35 volume % of hydrogen, and may optionally comprise other components, such as oxygen, nitrogen, water or combinations thereof. Preferably, the hydrogen rich gas stream comprises high purity hydrogen typically of 50% and higher by volume, particularly 65% and higher by volume, and especially 95% and higher by volume.

The oxygen rich gas stream comprises oxygen, and may optionally comprise other components, such as nitrogen, hydrogen, water or combinations thereof. Preferably, the oxygen rich gas stream comprises of high purity oxygen typically of 70% and higher by volume, particularly 80% and higher by volume, and specifically 90% and higher by volume.

According to the present disclosure, the reverse water gas shift reaction in the reaction vessel takes place at elevated temperature which is needed to sufficiently activate the catalytic conversion of carbon dioxide and hydrogen into carbon monoxide and water in the bottom zone (z2). The temperature in the top zone (z1) is maintained in the range 700 to 1200° C., and preferably, the temperature in the top zone (z1) is maintained in the range of 800 to 1100° C. The pressure maintained in the reactor vessel is the range of 1 bar to 80 bar. Preferably, the pressure in the reaction vessel is from 5 to 70 bar.

In the process according to the present disclosure, the hydrogen rich gas stream is introduced into the reaction vessel at a temperature between 15 and 450° C., in particular between 100 and 300° C., more particularly between 150 and 250° C., and especially between 220 and 240° C.

According to the present disclosure, the oxygen rich gas stream is introduced into the reaction vessel at room temperature or at a slightly elevated temperature. Preferably, the oxygen rich gas stream is introduced into the reaction vessel at a temperature between 15 and 300° C., in particular between 100 and 280° C., more particularly between 120 and 260° C., and especially between 220 and 260° C.

According to the present disclosure, the gas stream comprising carbon dioxide is introduced into the reaction vessel at room temperature or at a slightly elevated temperature. Preferably, the gas stream comprising carbon dioxide is introduced into the reaction vessel at a temperature between 15 and 700° C., in particular between 50 and 600° C., more particularly between 150 and 500° C., and especially between 200 and 450° C.

According to the present disclosure, any optional additional gas stream that is introduced into the reaction vessel as co-feed or pre-mixed gas stream, is introduced at room temperature or at a slightly elevated temperature. Preferably, the optional additional gas stream is introduced into the reaction vessel at a temperature between 15 and 500° C., in particular between 50 and 450° C.

In the process according to the present disclosure, the feed streams to the reverse water gas shift reaction vessel, at least the hydrogen rich gas stream and the oxygen rich gas stream are introduced into the reaction vessel via a burner comprising coaxial channels, which may have different slit widths, for the separate introduction of the different gas streams, potentially at different velocities, the velocities of the gases in the channels being preferably between 1-200 m/s, more preferably between 3-120 m/s. These velocity ranges vary depending on the feed stream. Burner construction may require providing an angle to burner tips to accommodate them within a target burner mouth opening. Preferably, the angle of a burner tip end is between 5-90 degrees, preferably between 20-65 degrees, for each of the coaxial channels. See for example FIGS. 9 and 10. Burners suitable for this purpose are known in the art, such as described in WO2015011114. In the process according to the present disclosure, the burner is located at the top of the reaction vessel.

According to the present disclosure, the hydrogen rich gas stream and the oxygen rich gas stream advantageously undergo an exothermic reaction in front of the tip of the burner in top zone (z1) providing the heat energy required for the catalytic endothermic reverse water gas shift reaction in the bottom zone (z2) to occur. Since this combustion reaction in top zone (z1) is exothermic, the excessive heat energy may cause damage to the burner. In order to prevent the hydrogen rich gas stream and the oxygen rich gas stream from reacting in close vicinity of the burner outlet, part of the gas stream containing carbon dioxide is introduced via a channel in between the hydrogen rich gas stream and the oxygen rich gas stream. Preferably, in addition, the oxygen rich gas stream is introduced via the inner channel(s) of the burner, and the remaining part of the gas stream containing carbon dioxide is introduced in an outer channel of the burner, being outside of the channels for the hydrogen rich gas stream and oxygen rich gas stream, to prevent overheating of the burner due to high heat energy caused by the reaction of the hydrogen rich gas stream and the oxygen rich gas stream inside the reaction vessel. As described above, the temperature in the top zone (z1) is maintained in the range 700 to 1200° C., and preferably, the temperature in the top zone (z1) is maintained in the range of 800 to 1100° C. The temperature in the reaction vessel is maintained by adjusting the flow of any of the gas streams which are introduced into the reaction vessel, usually the flow of oxygen rich gas. Adjustment of flows of carbon dioxide and/or hydrogen also may result in changes to the reactor temperature and therefore may also be used as means of temperature control.

According to the present disclosure, the catalyst used can be any catalyst suitable for use in the reverse water gas shift process. For example, catalyst compositions suitable for catalyzing reverse water gas shift reaction include metal, metal oxides, or any combinations thereof. The catalytically active material is optionally supported on a catalyst support material. Such catalyst is preferably characterized by a low selectivity for the formation of methane. Further, suitable catalysts should display a sufficient high stability, for instance in terms of thermal stability but also in terms resistance against coke formation on the catalyst. The catalyst material is formed into shaped bodies according to process requirements and as known to persons skilled in the art. Particular body shapes may be required to fulfill criteria regarding heat transfer, pressure drop etc. Catalysts for use in reverse water gas shift reactions are known in the art, see for example US20100190874, WO2013135664, US2015307352, US2016296916, US2016332874, US2017197829, Catalyst Screening and Kinetic Modeling for CO Production by High Pressure and Temperature Reverse Water Gas Shift for Fischer-Tropsch Applications, Francisco Vidal Vázquez, Peter Pfeifer, Juha Lehtonen, Paolo Piermartini, Pekka Simell, and Ville Alopaeus, Ind. Eng. Chem. Res. 2017, 56, 13262-13272; and the like.

In the process according to the present disclosure, the catalyst bed is placed at a distance from the reactor inlet that is sufficient to avoid damage at the top of the catalyst bed by the flame produced by the burner. Particularly, the catalyst bed is placed above the reactor outlet located at the bottom of the reaction vessel, while minimizing the free space between the catalyst bed and the reactor outlet. The size of the catalyst bed can range between 0.2-4 times the inner diameter of the reactor.

In a preferred embodiment, a solids bed comprising refractory oxide material capable of retaining majority of soot particles is positioned on top of the catalyst bed. The solids bed protects the catalyst bed from fouling by soot particles by capturing a majority of them upstream of the catalyst bed and providing them sufficient time to convert mainly to carbon monoxide. Suitable refractory materials are selected from ceramic materials known in the state of art. The solids bed could be mounted inside the reactor by means known in the art, for example, as described in US2009/0224209A1. The size of the solids bed can range between 0-2 times the inner diameter of the reactor.

The product stream at the outlet of the reverse water gas shift reaction vessel comprises of carbon monoxide, hydrogen, water, unconverted carbon dioxide, some methane or combinations thereof.

Different downstream applications require different ratio of hydrogen to carbon monoxide in the product stream. The ratio of hydrogen to carbon monoxide by volume at the outlet of the reverse water gas shift reaction vessel is in the range of 0.5 to 5, preferably in the range of 1 to 2. The ratio of the hydrogen to carbon dioxide by volume at the inlet of the reverse water gas shift reaction vessel varies from 1 to 5, preferably between 2 and 3.5. The ratio of hydrogen to carbon dioxide is adjusted such that the required hydrogen to carbon monoxide ratio in the product stream is obtained.

According to the present disclosure, the reverse water gas shift reaction vessel is preferably preheated, in particular in the range from 25° C. up to 1100° C., to initiate the reverse water gas shift reaction. The preheating of the reaction vessel may be performed by passing through the reaction vessel a mixture of hot gases resulting, for example, from the combustion of natural gas and air. Alternatively, other options for preheating may be used, like electrically heating. In the process according to the present disclosure, the product stream exiting the reaction vessel is cooled in a water-cooled heat exchanger. Alternatively, the product stream is cooled directly with water. In both cases, a cooled product mixture comprising carbon monoxide, hydrogen, steam and unconverted carbon dioxide is produced. The cooling process making use of the special heat exchanger advantageously transfers heat energy from the product stream to cooling water to produce steam. The product stream or steam produced is used to advantageously preheat one or more of the feed streams selected from the gas stream comprising carbon dioxide, hydrogen rich gas stream and oxygen rich gas stream, and optionally additional gas streams introduced into the reaction vessel as co-feed or pre-mixed gas streams that enter the reaction vessel. Alternatively, one or more of the feed streams selected from the gas stream comprising carbon dioxide, hydrogen rich gas stream and oxygen rich gas stream, and optionally additional gas streams can be preheated externally by other forms of heating including electrical heaters. Preheating one or more of these feed streams increases the efficiency of the reverse water gas shift process.

According to the present disclosure, a water splitter can be used to produce at least a part of the hydrogen rich gas stream and the oxygen rich gas stream. A water splitter is a device that splits water into hydrogen and oxygen. Such a water splitter may be, among others, electrolysis of water using electrical energy, photo electrochemical water splitting, photocatalytic water splitting, thermal decomposition of water and other known in the art methods of water splitting. A preferred water splitter is an electrolyzer. Energy sources for the water splitting will advantageously be provided by renewable power sources, such as solar and/or wind energy.

According to the present disclosure, the oxygen rich gas stream from the water splitter can be advantageously liquified, optionally stored, and re-gasified before use as feed.

According to the present disclosure, the cooled product stream comprising carbon monoxide, hydrogen, steam and unconverted carbon dioxide is subjected to further cooling at least to, and beyond, the dew point to provide a gas stream comprising of carbon monoxide, hydrogen, unconverted carbon dioxide and liquid water which can then be separated from the product gas stream. Separators suitable for this purpose are known to people skilled in the art. The liquid water stream thus separated is then recycled back to the water splitter after treating. As long as the product stream exiting the separator, comprising carbon monoxide and hydrogen produced by the process described above, still comprises unconverted carbon dioxide, the product stream exiting the separator advantageously may be repeatedly subjected to said process steps to convert further carbon dioxide present. In the process according to the present disclosure, multiple stages for the reverse water gas shift process are required if further conversion of the unconverted carbon dioxide in the product stream is required. The multiple stages are a repeat of the entire reverse water gas shift process explained above. The cooled product gas stream comprising of carbon monoxide, hydrogen, unconverted carbon dioxide, thus obtained from the first reaction vessel after being subjected to cooling and separation of liquid water, is the feed to a second reverse water gas shift reaction vessel along with one or more feed streams selected from hydrogen rich gas stream and the oxygen rich gas streams from the water splitter. The product stream comprising carbon monoxide, hydrogen, water, unconverted carbon dioxide or combinations thereof, from the second reaction vessel is subjected to further cooling and separation of the liquid water from the cooled product gas stream comprising carbon monoxide, hydrogen and unconverted carbon dioxide. One or more of the feed streams for the second reaction vessel selected from the product gas stream comprising carbon dioxide, hydrogen, water, unconverted carbon dioxide, optional additional gas streams introduced into the reaction vessel as co-feed or pre-mixed gas streams, hydrogen rich gas stream and oxygen rich gas stream may be advantageously preheated using any of the preheating methods described above.

The process of this disclosure may advantageously be performed in a reverse water-gas shift process unit comprising at least one reaction vessel operatively connected to a cooling unit, and further comprising a gas introduction line connected to a water splitter unit. The process unit, preferably is provided with a burner at the top of a top zone (z1) of the vessel, and a catalyst bed in a bottom zone (z2) of the vessel, operatively connected to a cooling unit, and further comprising at least one gas introduction line connected to a water splitter unit. The reaction vessel is oriented in an advantageous manner, either horizontal or vertical, as required by the process. The length of top zone (z1) is between 1-5 times the inner diameter of the reaction vessel and the length of the bottom zone (z2) is between 0.3-0.6 times the height of the reaction vessel. The outlet of the reaction vessel is placed in an advantageous manner, either at the bottom of the vessel or at the side of the vessel below the catalyst bed. If the outlet is placed at the side of the vessel, there may exist some empty space between the bottom of the vessel and the outlet.

When multiple stages for the reverse water gas shift process are required, if further conversion of the unconverted carbon dioxide in the product stream is required, this is preferably performed in a unit comprising at least two reaction vessels, each of which are operatively connected to a cooling unit, which are placed in consecutive order of a first reaction unit followed by a cooling unit and again followed by a reaction unit followed by a cooling unit, and the process unit further comprising at least one gas introduction line connected to a water splitter unit.

The process, or process steps thereof, and process unit(s) of the present invention may advantageously be integrated into processes requiring synthesis gas as a feedstock.

DESCRIPTION OF THE DRAWINGS

Legend: P refers to the (catalytic) reverse water gas shift process unit comprising a reaction vessel provided with a burner at the top of the top zone (z1) of the vessel, and a catalyst bed in the bottom zone (z2) of the vessel. Q refers to (a) process unit(s) that act as syngas cooler. R is/are (a) process unit(s) that act as a water splitter. S is/are (a) process unit(s) that act as syngas cooler and water separator. All the figures illustrated are possible schematic interpretations of the present disclosure.

In FIG. 3, cooled product stream 4' is used to preheat the gas stream comprising carbon dioxide 1, and steam 6 is used to preheat hydrogen rich gas stream 2 and oxygen rich gas stream 3.

In FIG. 4, cooled product stream 4' is used to preheat the gas stream comprising carbon dioxide 1, and steam 6 is used to preheat hydrogen rich gas stream 2 and oxygen rich gas stream 3. Unit R is used to produce at least part of the hydrogen rich gas stream 2 and oxygen rich gas stream 3 from water 7 using an energy source 8. Excess oxygen rich gas stream 9 is taken out which can be utilized elsewhere or vented.

In FIG. 5, cooled product stream 4' is used to preheat the gas stream comprising carbon dioxide 1, and steam 6 is used to preheat hydrogen rich gas stream 2 and oxygen rich gas stream 3. R is used to produce at least part of the hydrogen rich gas stream 2 and oxygen rich gas stream 3 from water 7 using an energy source 8. The cooled product gas stream 4' is further cooled to dew point in S and liquid water 14 is separated from the cooled product gas stream 13 in S. Excess oxygen rich gas stream 9 is taken out which can be utilized or vented.

Hereinafter the invention will be further illustrated by the following non-limiting example.

EXAMPLE 1

Figure 1:
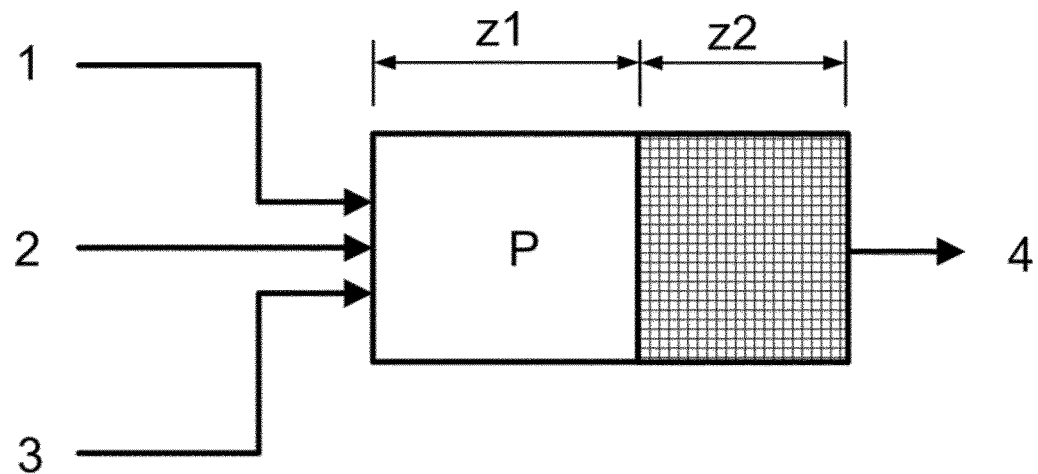
FIG. 1. illustrates an embodiment of the present disclosure of the catalytic reverse water gas shift process where the gas stream comprising carbon dioxide 1, hydrogen rich gas stream 2 and oxygen rich gas stream 3 enter P via a burner to form a product gas stream 4 comprising carbon monoxide, hydrogen, water and likely some unconverted carbon dioxide. Optional additional gas streams are not shown in FIG. 1.
Figure 2:
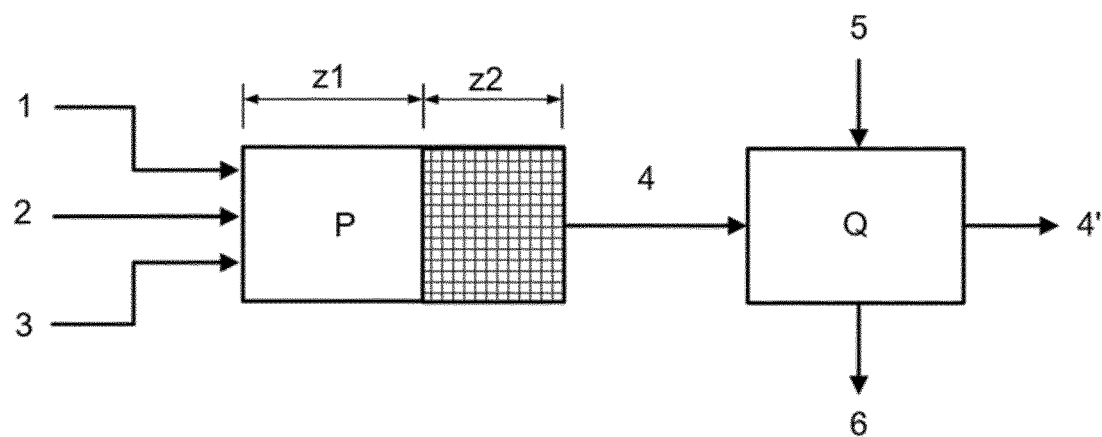
FIG. 2. Illustrates another embodiment of the present disclosure where the the gas stream comprising carbon dioxide 1, hydrogen rich gas stream 2 and oxygen rich gas stream 3 enter P via a burner to form a product gas stream 4 comprising carbon monoxide, hydrogen, water and likely some unconverted carbon dioxide. The product stream 4 is cooled with water 5 in Q to make steam 6 and cooled product stream 4'.
Figure 3:
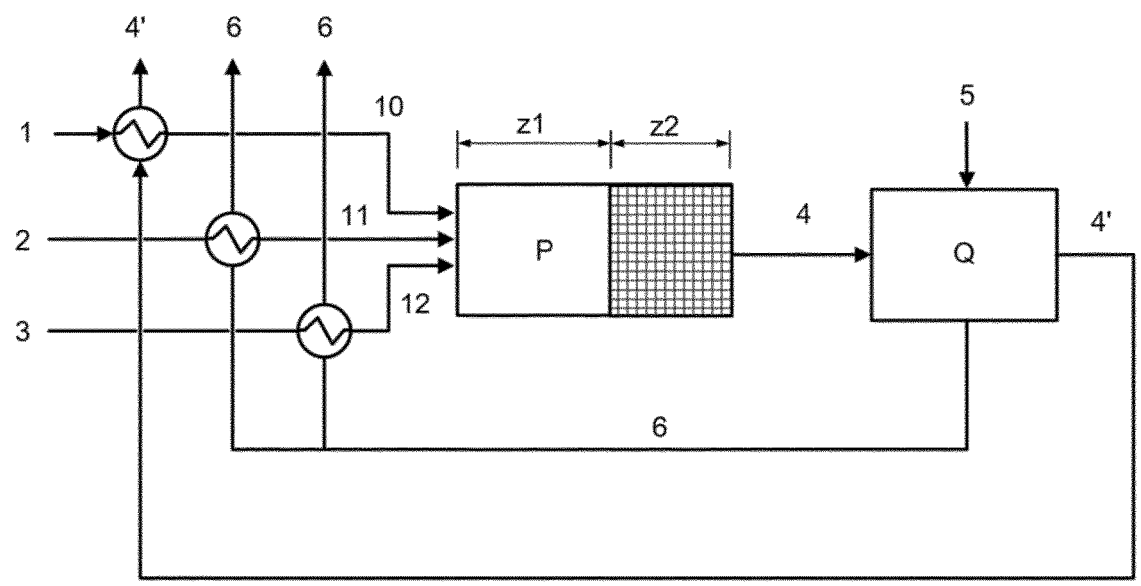
FIG. 3. Illustrates another embodiment of the present disclosure where a preheated gas stream containing carbon dioxide 10, preheated hydrogen rich gas stream 11 and preheated oxygen rich gas stream 12 enter P via a burner to form a product gas stream 4 comprising carbon monoxide, hydrogen, water and likely some unconverted carbon dioxide. The product stream 4 is cooled with water 5 in Q to make steam 6 and cooled product stream 4'. One or both of the streams selected from cooled product stream 4' and steam 6 may be used to preheat one or more of the feed streams selected from gas stream comprising carbon dioxide 1, hydrogen rich gas stream 2 and oxygen rich gas stream 3.
Figure 4:
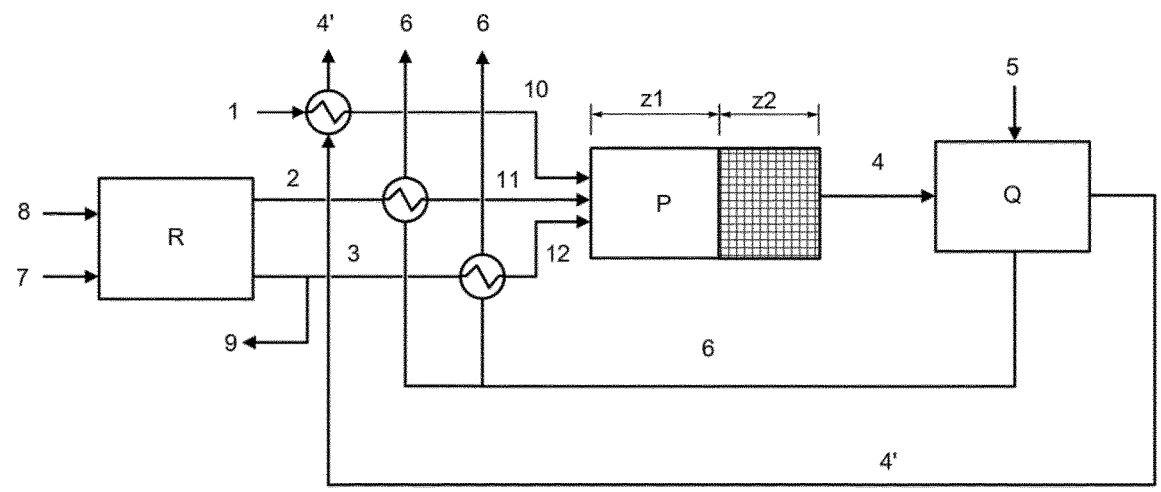
FIG. 4. Illustrates another embodiment of the present disclosure where a preheated gas stream comprising carbon dioxide 10, preheated hydrogen rich gas stream 11 and preheated oxygen rich gas stream 12 enter P via a burner to form a product gas stream 4 comprising carbon monoxide, hydrogen, water and possibly unconverted carbon dioxide. The product stream 4 is cooled with water 5 in Q to make steam 6 and cooled product stream 4'. One or both of the streams selected from cooled product stream 4' and steam 6 may be used to preheat one or more of the feed streams selected from gas stream comprising carbon dioxide 1, hydrogen rich gas stream 2 and oxygen rich gas stream 3.
Figure 5:
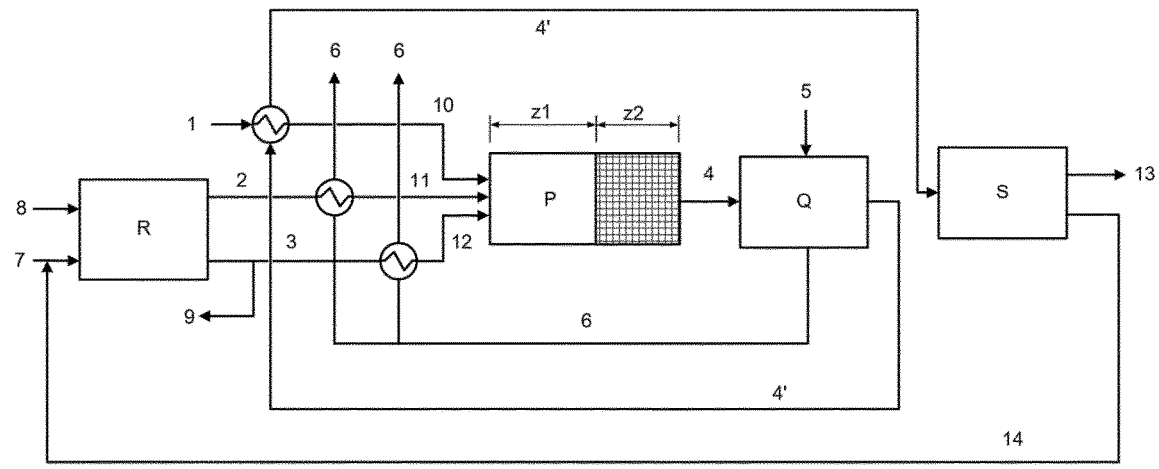
FIG. 5. Illustrates another embodiment of the present disclosure where the preheated gas stream comprising carbon dioxide 10, preheated hydrogen rich gas stream 11 and preheated oxygen rich gas stream 12 enter P via a burner to form a product gas stream 4 comprising carbon monoxide, hydrogen, water and possibly unconverted carbon dioxide. The product stream 4 is cooled with water 5 in Q to make steam 6 and cooled product stream 4'. One or both of the streams selected from cooled product stream 4' and steam 6 may be used to preheat one or more of the feed streams selected from gas stream comprising carbon dioxide 1, hydrogen rich gas stream 2 and oxygen rich gas stream 3.
Figure 6:
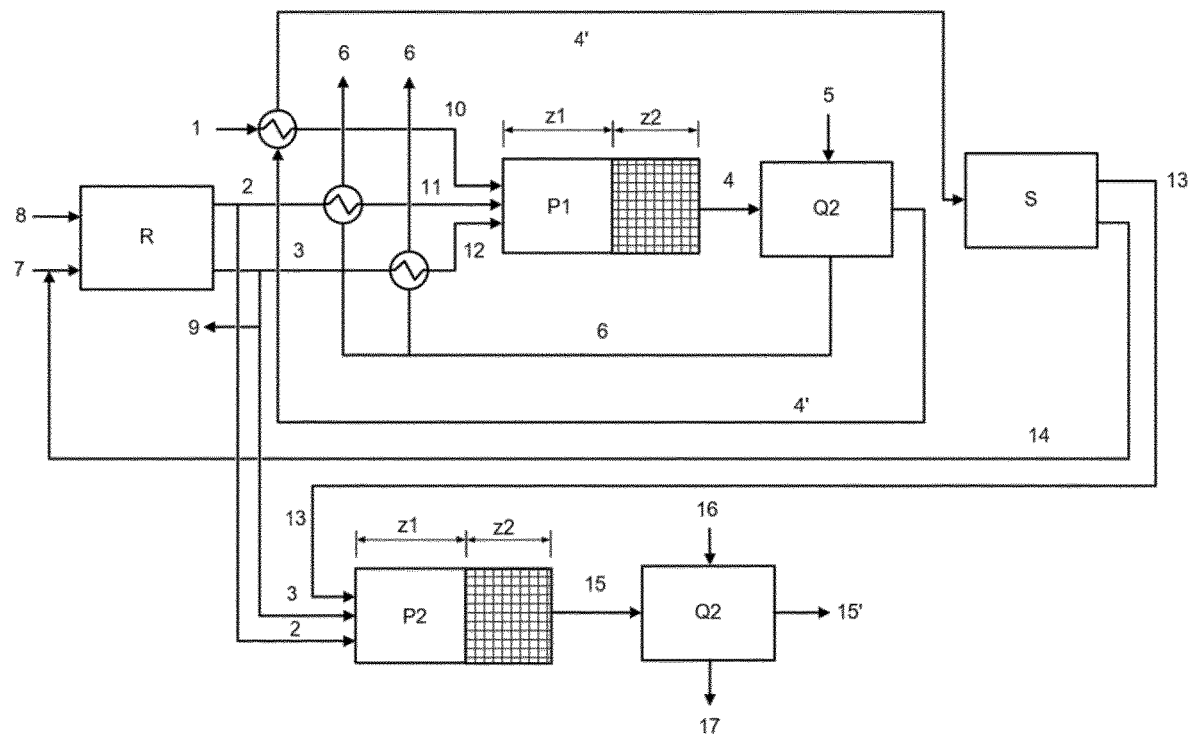
FIG. 6. Illustrates another embodiment of the present disclosure where the preheated gas stream comprising carbon dioxide 10, preheated hydrogen rich gas stream 11 and preheated oxygen rich gas stream 12 enter P1 to form a product gas stream 4 comprising carbon monoxide, hydrogen, water and unconverted carbon dioxide. The product stream 4 is cooled with water 5 in Q1 to make steam 6 and cooled product stream 4'. One or both of the streams selected from the cooled product stream 4' and steam 6 may be used to preheat one or more of the feed streams selected from gas stream containing carbon dioxide 1, hydrogen rich gas stream 2 and oxygen rich gas stream 3. R is used to produce at least part of the hydrogen rich gas stream 2 and oxygen rich gas stream 3 from water 7 using an energy source 8. The cooled product gas stream 4' is further cooled to dew point in S and liquid water 14 is separated from the cooled product gas stream 13 in S. Unconverted carbon dioxide in the product gas stream 13 is further converted to carbon monoxide by subjecting it to a second stage reverse water gas shift process. The product gas stream 13 along with a hydrogen rich gas stream 2 and oxygen rich gas stream 3 enter P2 to form a product gas stream 15 comprising carbon monoxide, hydrogen, water and unconverted carbon dioxide. The product stream 15 is cooled with water 16 in Q2 to make steam 17 and cooled product stream 15'. Excess oxygen rich gas stream 9 is taken out which can be utilized or vented.

The following example refers to the processes as explained in the different embodiments of the present disclosure as described in FIG. 1 and FIG. 3.

Table 1 illustrates the product stream (main product is synthesis gas) compositions at the outlet of catalytic reverse water gas shift reaction vessel for different reactor temperatures for two different cases: when the feed streams are not preheated (as illustrated in FIG. 1) and when they are preheated (as illustrated in FIG. 3). The feed $H_2$ to $CO_2$ ratio is constant for all cases. The catalytic reverse water gas shift reactor temperature is controlled by adjusting the flow of oxygen to the reactor. The synthesis gas composition results were obtained by assuming that the synthesis gas at the outlet of the catalytic reverse water gas shift reactor is at steady state thermodynamic equilibrium at the outlet of the reaction vessel.

Figure 7:
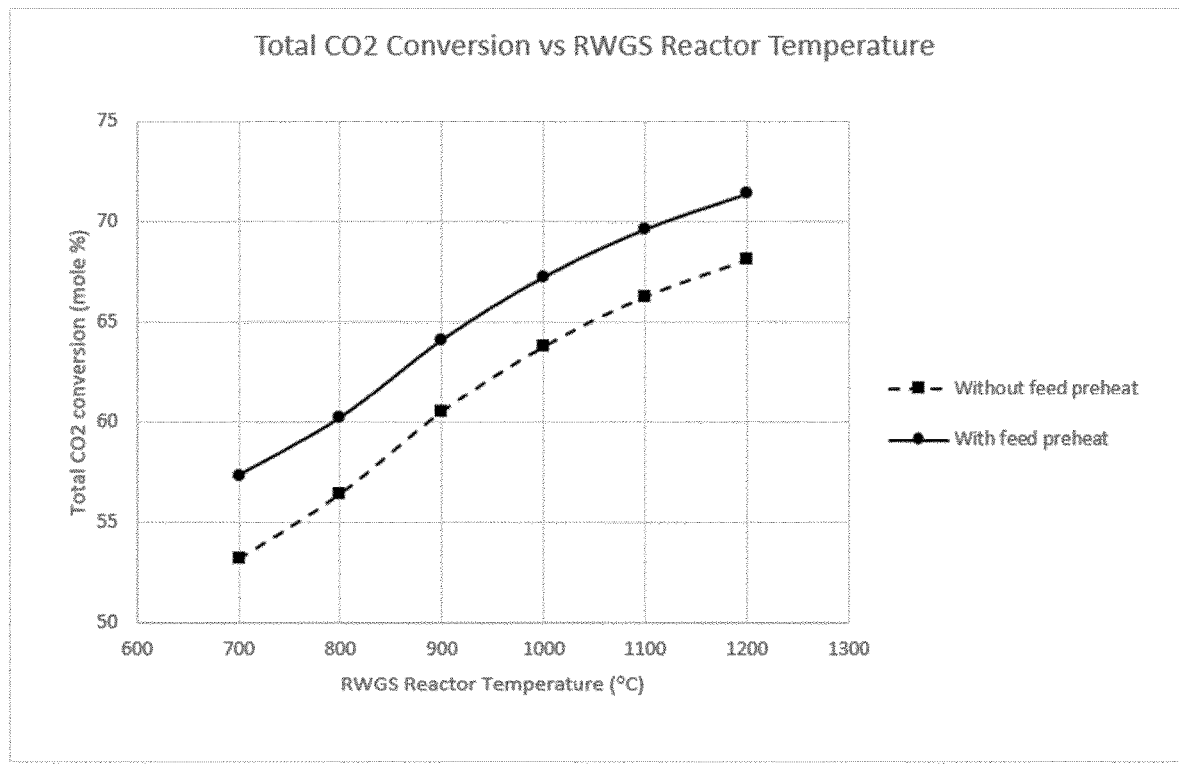
FIG. 7. Illustrates the total carbon dioxide conversion at different RWGS reactor temperatures for two different embodiments of the present disclosure as explained in FIG. 1 and FIG. 3.
Figure 8:
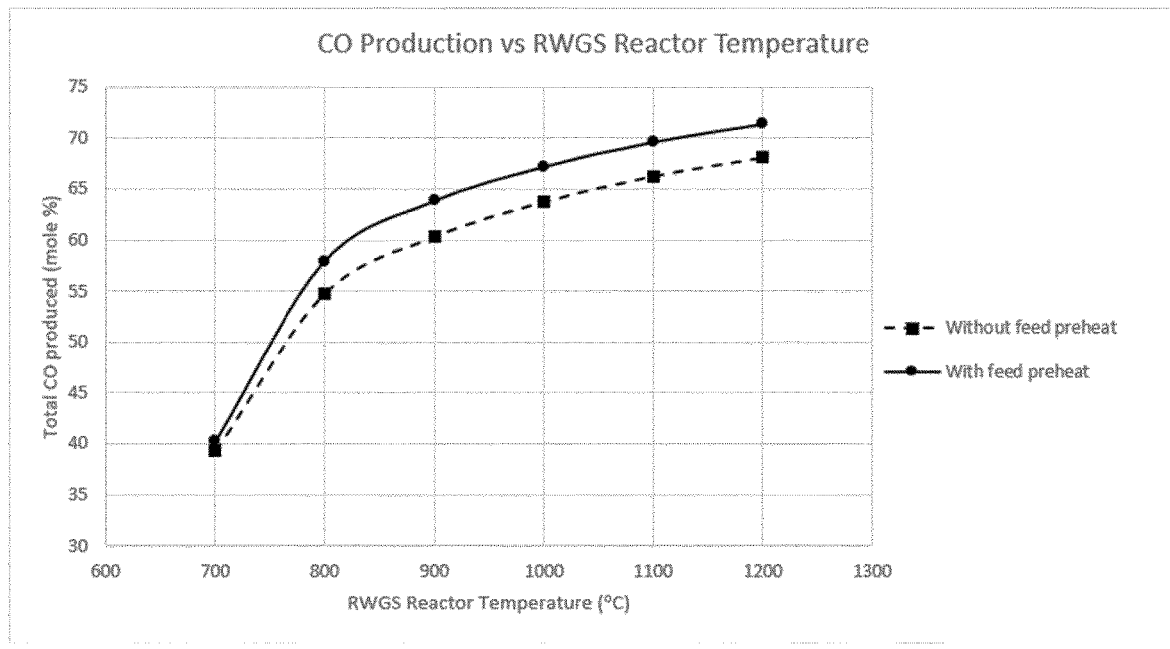
FIG. 8. Illustrates the total carbon monoxide production at different RWGS reactor temperatures for two different embodiments of the present disclosure as explained in FIG. 1 and FIG. 3.
Figure 9:
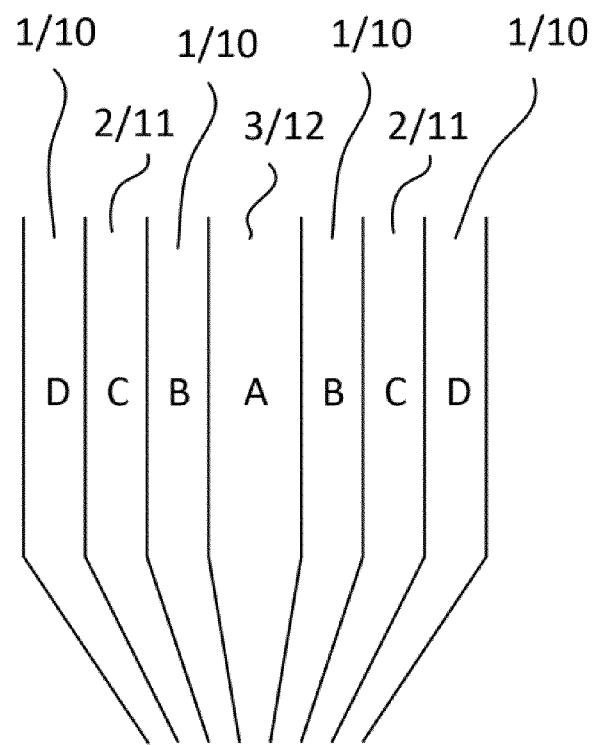
FIG. 9. illustrates an embodiment of a burner that can be used in the process according to the present disclosure. The exemplified burner contains four coaxial channels A, B, C and D, but more channels may also be possible. Oxygen rich gas stream 3 or preheated oxygen rich gas stream 12 (i.e. gas stream 3/12) enters the reaction vessel via channel A of the burner. A portion of the gas stream comprising carbon dioxide 1 or preheated gas stream comprising carbon dioxide 10 (i.e. gas stream 1/10) advantageously enters the reaction vessel via channel B of the burner. Hydrogen rich gas stream 2 or preheated hydrogen rich gas stream 11 (i.e. gas stream 2/11) enters the reaction vessel via channel C of the burner. Another portion of the gas stream comprising carbon dioxide 1 or preheated gas stream comprising carbon dioxide 10 (i.e. gas stream 1/10) enters the reaction vessel via channel D of the burner.
Figure 10:
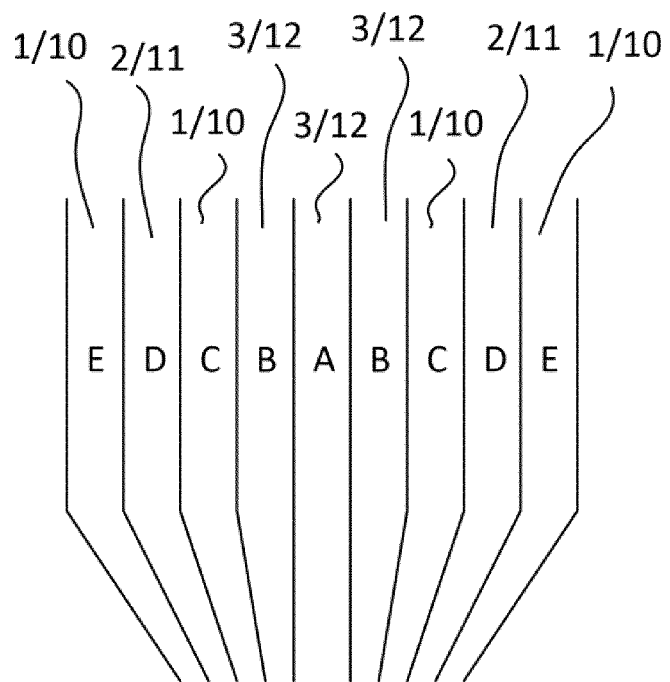
FIG. 10. illustrates another embodiment of a burner that can be used in the process according to the present disclosure. The burner contains five coaxial channels A, B, C, D and E. Oxygen rich gas stream 3 or preheated oxygen rich gas stream 12 (i.e. gas stream 3/12) enters the reaction vessel via channels A and B of the burner. A portion of the gas stream comprising carbon dioxide 1 or preheated gas stream comprising carbon dioxide 10 (i.e. gas stream 1/10) advantageously enters the reaction vessel via channel C of the burner. Hydrogen rich gas stream 2 or preheated hydrogen rich gas stream 11 (i.e. gas stream 2/11) enters the reaction vessel via channel D of the burner. Another portion of the gas stream comprising carbon dioxide 1 or preheated gas stream comprising carbon dioxide 10 (i.e. gas stream 1/10) enters the reaction vessel via channel E of the burner.

FIG. 7 and FIG. 8 illustrate the total carbon dioxide conversion and total carbon monoxide produced for different RWGS reactor temperatures for two different cases: when the feed streams are not preheated (as illustrated in FIG. 1) and when they are preheated (as illustrated in FIG. 3).

TABLE 1

| | Temp. (° C.) | | | | | | | |
|---|---|---|---|---|---|---|---|---|
| | 700 | 800 | 1000 | 1200 | 700 | 800 | 1000 | 1200 |
| $H_2/CO_2$ | 3 | 3 | 3 | 3 | 3 | 3 | 3 | 3 |
| Feed Preheat | No | No | No | No | Yes | Yes | Yes | Yes |
| Product stream composition (mole %) | | | | | | | | |
| $H_2$ | 46.1 | 47.1 | 42.3 | 37.7 | 47.8 | 49.6 | 45.0 | 40.6 |
| CO | 10.6 | 13.8 | 15.9 | 17.0 | 11.0 | 14.7 | 16.8 | 17.9 |
| $CO_2$ | 12.6 | 11.0 | 9.1 | 8.0 | 11.7 | 10.1 | 8.2 | 7.2 |
| $H_2O$ | 27.0 | 27.7 | 32.7 | 37.3 | 24.9 | 25.1 | 30.0 | 34.4 |
| $CH_4$ | 3.7 | 0.4 | 0.0 | 0.0 | 4.7 | 0.6 | 0.0 | 0.0 |
| Total | 100 | 100 | 100 | 100 | 100 | 100 | 100 | 100 |

We claim:

1. A process for converting carbon dioxide and hydrogen by performing a reverse water gas shift reaction at elevated temperature, the process comprising introducing carbon dioxide, hydrogen and oxygen into a reaction vessel having an inlet and an outlet, and, wherein
the reverse water gas shift reaction takes place in two different zones of the reaction vessel, being a top zone (z1) adjacent to a bottom zone (z2), wherein
(a) no catalyst is present in the top zone (z1) of the reaction vessel, and
(b) at least a gas stream comprising carbon dioxide, a hydrogen rich gas stream and an oxygen rich gas stream are introduced into the inlet at the top zone (z1) of the reaction vessel in separate feed streams, wherein the hydrogen rich gas stream is introduced into the reaction vessel at a temperature between 15 and 450° C.,
(c) the hydrogen rich gas stream and oxygen rich gas stream being introduced in close vicinity of each other, wherein at least the hydrogen rich gas stream and the oxygen rich gas stream are introduced into the reaction vessel via a burner comprising coaxial channels for the separate introduction of the different gas streams, the burner being located at the top of the reaction vessel, wherein the hydrogen and oxygen in the hydrogen rich gas stream and oxygen rich gas stream undergo a combustion reaction upon entering the reaction vessel, thereby providing the heating energy required for the reverse water-gas shift reaction; and
(d) the temperature in the top zone (z1) of the reaction vessel is maintained in the range of 700 to 1200° C. by varying the flow of any of the gas streams which are introduced into the reaction vessel; and
(e) the bottom zone (z2) of the reaction vessel is provided with a catalyst bed comprising a reverse water gas shift catalyst, the top of the catalyst bed being placed at a distance from the burner in the top zone (z1) sufficient to prevent damage from flame impingement on the catalyst bed;
(f) wherein in the bottom zone (z2) of the reaction vessel a catalytic reverse water gas shift reaction takes place at elevated temperatures, thereby converting unconverted carbon dioxide and hydrogen;
to produce a product stream comprising mainly carbon monoxide, hydrogen and water;
wherein in step (c) the hydrogen rich gas stream and oxygen rich gas stream are introduced into the reaction vessel in close vicinity of but not next to each other; and
wherein part of the gas stream containing carbon dioxide is introduced via a channel in between the hydrogen rich gas stream and the oxygen rich gas stream.

2. The process according to claim 1, wherein the catalyst bed is placed above the reactor outlet, which is located at the bottom of the reaction vessel, minimizing the free space between the catalyst bed and the reactor outlet.

3. The process according to claim 1, wherein a solids bed comprising refractory oxide material capable of retaining soot particles is positioned on top of the catalyst bed.

4. The process according to claim 1, wherein the product stream leaving the hot reaction vessel is cooled in a heat exchanger with water to provide a cooled product mixture comprising mainly carbon monoxide and hydrogen and steam.

5. The process according to claim 4, wherein the product stream or steam produced after cooling the product stream is used to preheat one or more of the feed gas streams selected from the gas stream comprising carbon dioxide, the hydrogen rich gas stream, the oxygen rich gas stream, and optionally additional gas streams introduced into the reaction vessel as co-feed or pre-mixed gas streams.

6. The process according to claim 1, wherein at least part of the hydrogen rich gas stream and/or at least part of the oxygen rich gas stream in the feed is obtained from a water splitter.

7. The process according to claim 1, wherein one or more gas streams selected from a gas stream comprising carbon dioxide, a hydrogen rich gas stream and an oxygen rich gas stream, are preheated before being introduced into the reaction vessel.

* * * * *